US009525569B2

(12) United States Patent
Plasberg et al.

(10) Patent No.: US 9,525,569 B2
(45) Date of Patent: Dec. 20, 2016

(54) ENHANCED CIRCUIT-SWITCHED CALLS

(75) Inventors: Jan Plasberg, Stockholm (SE); Koen Vos, San Francisco, CA (US)

(73) Assignee: Skype, Dublin (IE)

( * ) Notice: Subject to any disclaimer, the term of this patent is extended or adjusted under 35 U.S.C. 154(b) by 650 days.

(21) Appl. No.: 12/716,567

(22) Filed: Mar. 3, 2010

(65) Prior Publication Data
US 2011/0216694 A1  Sep. 8, 2011

(51) Int. Cl.
*H04L 12/66* (2006.01)
*H04W 4/00* (2009.01)

(52) U.S. Cl.
CPC ............... *H04L 12/66* (2013.01); *H04W 4/00* (2013.01)

(58) Field of Classification Search
None
See application file for complete search history.

(56) References Cited

U.S. PATENT DOCUMENTS

| | | | | |
|---|---|---|---|---|
| 5,872,852 A * | 2/1999 | Dougherty | ............... | H03G 3/32 381/104 |
| 7,869,424 B2 * | 1/2011 | Delveaux | ............ | H04L 12/4035 370/352 |
| 8,103,516 B2 * | 1/2012 | Oshikiri | .............. | G10L 19/0204 704/205 |
| 9,043,214 B2 * | 5/2015 | Vos | ..................... | G10L 19/0208 704/223 |
| 2002/0001302 A1 * | 1/2002 | Pickett | ................ | H04L 12/2856 370/352 |
| 2002/0097886 A1 * | 7/2002 | Maruo | ..................... | H04R 1/26 381/182 |
| 2003/0126238 A1 * | 7/2003 | Kohno | .................. | H04L 1/0009 709/220 |
| 2005/0288029 A1 * | 12/2005 | Jacobsen | ............... | H04W 16/04 455/447 |
| 2006/0109819 A1 * | 5/2006 | Marin | ..................... | H04L 12/18 370/331 |
| 2007/0002831 A1 * | 1/2007 | Allen | ..................... | H04L 67/14 370/352 |
| 2007/0014280 A1 * | 1/2007 | Cormier | ............ | H04M 1/72563 370/352 |

(Continued)

*Primary Examiner* — Marsha D Banks Harold
*Assistant Examiner* — Christopher Wyllie
(74) *Attorney, Agent, or Firm* — Tom Wong; Micky Minhas

(57) ABSTRACT

A terminal for transmitting a voice signal, comprising: a transmitter having a first transmission module arranged to transmit signals over a packet-switched data network and a second transmission module arranged to transmit signals over a circuit-switched telephony network; a microphone for generating a voice signal; and signal processing apparatus configured to generate a first signal and a second signal from the voice signal, each representing information from the voice signal over a same portion of time. The signal processing apparatus is further configured to supply the first signal to the first transmission module for transmission to a receiver via the packet-switched data network, and to supply the second signal to the second transmission module for transmission to the receiver via the circuit-switched telephony network. There is also provided a terminal for receiving such signals and reconstructing the voice signal, and corresponding methods and program products.

21 Claims, 3 Drawing Sheets

(56) References Cited

U.S. PATENT DOCUMENTS

| | | | |
|---|---|---|---|
| 2007/0088558 A1* | 4/2007 | Vos | G10L 19/0208 704/275 |
| 2008/0040122 A1* | 2/2008 | Chen | G10L 19/005 704/501 |
| 2008/0077399 A1* | 3/2008 | Yoshida | G10L 21/038 704/208 |
| 2008/0273524 A1* | 11/2008 | Tenny | H04W 68/12 370/352 |
| 2009/0268673 A1* | 10/2009 | Roberts | H04W 72/005 370/329 |
| 2011/0295598 A1* | 12/2011 | Yang | G10L 21/038 704/205 |
| 2012/0134340 A1* | 5/2012 | Lei | H04W 36/0022 370/331 |

* cited by examiner

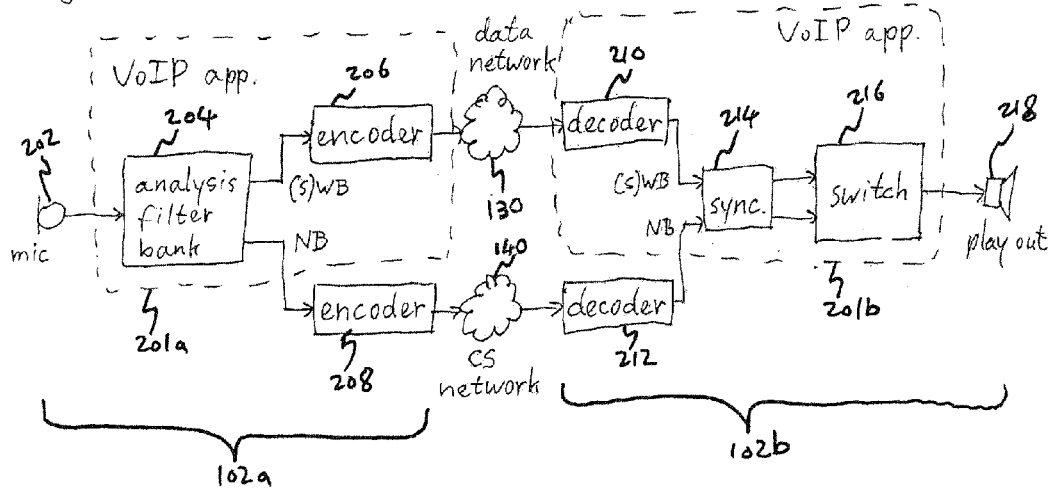
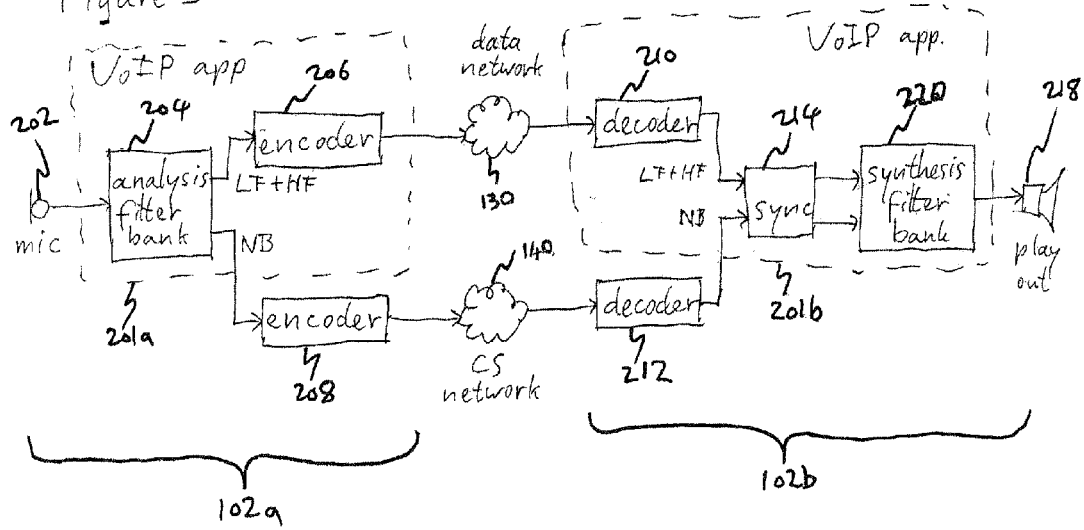

ENHANCED CIRCUIT-SWITCHED CALLS

FIELD OF THE INVENTION

The present invention relates to enhancing the quality of calls made over a circuit-switched network.

BACKGROUND

Traditionally, phone calls have been made over circuit-switched (CS) networks in which a reliable connection for a call is created between the communication end points. The circuit-switched connection (i.e. the "circuit") provides a channel in the form of a specified, predetermined path for routing the voice information of the call. Because the required network resources are thus reserved for the call, there is a low probability of information being lost unless there is actually a network fault. Furthermore, the delay per unit information is constant. For these reasons the connection can be considered reliable. However, circuit-switched networks typically only support a limited bandwidth, i.e. only a limited range of frequencies from the voice signal can be encoded for transport over the circuit switched network.

More recently, voice over internet protocol (VoIP) has become a widely used alternative to circuit-switched calling, with advantages in cost and quality, but suffering from lower reliability. To transmit using VoIP (or indeed any such packet-switched medium), the encoded voice data of the call is divided into a plurality packets and the relevant destination address is added into a header of each packet. The route for each packet is then determined "on the fly" by the routing equipment of the packet-switched network. The packet-switched channel may therefore be considered a "virtual" channel. That is, in contrast with a circuit-switched channel, the physical path for each packet is not fixed or reserved for the call, and different packets of the same call may be routed differently without any predetermined path. Instead, the channel exists in the sense that the end points have performed a handshaking procedure in order to establish a session between them. The fact that the voice encoding is not a fixed feature of the network means that packet-switched calls allow a larger frequency range to be encoded and therefore potentially better call quality. On the other hand, the packet-based routing is less reliable because a certain amount of packet loss is expected (i.e. that expectation is an intrinsic feature of the system, e.g. with overloaded routers being arranged to discard packets, and error detection algorithms at routers or endpoints being arranged to reject corrupted packets). Furthermore, different packets can be delayed by different amounts, leading to further reliability issues for real-time communications.

The VoLGA ("Voice over LTE via Generic Access") forum provides specifications for implementing mobile VoIP calls using Long-Term Evolution (LTE) technology. VoLGA specifies the use of a "fall-back" mechanism which resorts to a circuit-switched channel when conditions over the packet-switched channel are poor.

SUMMARY

According to the VoLGA fall-back mechanism, the voice call is routed either over an LTE packet-switched data channel or over a circuit-switched channel, but not over both.

However, the inventors of the present invention have recognized that the perceived quality of voice calls can be enhanced by sending information about the speech signal simultaneously via both a circuit-switched channel and a data channel, and then combining both information streams on the receiver side.

According to one aspect of the present invention, there is provided a terminal for transmitting a voice signal, comprising: a transmitter having a first transmission module arranged to transmit signals over a packet-switched data network and a second transmission module arranged to transmit signals over a circuit-switched telephony network; a microphone for generating a voice signal; and signal processing apparatus coupled to the transmitter and the microphone, configured to generate a first signal and a second signal from the voice signal, each representing information from the voice signal over a same portion of time; wherein the signal processing apparatus is further configured to supply the first signal to the first transmission module for transmission to a receiver via the packet-switched data network, and to supply the second signal to the second transmission module for transmission to said receiver via the circuit-switched telephony network.

Preferably transmission over the circuit-switched telephony network is prioritized relative to transmission over the packet-switched data network, but the packet-switched data network supports a higher bandwidth than the circuit-switched telephony network. Thus although the circuit-switched network may support a lower frequency, it can still guarantee a certain lower limit to the call quality when channel conditions on the packet-switched network are poor. Preferably the first signal comprises a higher frequency band than the second signal.

There are two alternative preferred solutions. In the first solution, the first signal may comprise the higher frequency band without a lower frequency band, and the second signal may comprise the lower frequency band without the higher frequency band, such that the receiver may be enabled to reconstruct the voice signal from a combination of the first and second signals.

In this embodiment the receiver will be provided with two alternative signals via the two respective channels, and can switch between them in dependence on some criterion such as received quality. Although this requires transmission of some redundant information and therefore requires extra resources, the inventors have recognized that this downside is outweighed by the advantage that running the circuit-switched and packet-switched calls simultaneously can avoid a gap while switching between the two signals on the receiving side.

In the second preferred solution, the first signal may comprise both the higher frequency band and a lower frequency band, whilst the second signal may comprise the lower frequency band without the higher-frequency band, such that the receiver may be enabled to reconstruct the voice signal by switching between the first and second signals.

This embodiment avoids the redundant use of resources by only using the packet-switched network to transmit frequencies of the voice signal that cannot be accommodated by the circuit-switched network.

Another advantage that can be achieved by running the circuit-switched and packet-switched calls simultaneously is that it allows improved synchronization between the two voice signals at the receive side. This is because the receiver will have available two versions of the same information, one from each respective channel, which it can therefore use to align the two decoded information streams in time. The inventors have recognized that this advantage outweighs the extra resources required to transmit the two signals simultaneously over both the circuit-switched and packet-switched networks.

Furthermore, in embodiments the invention can be implemented before LTE deployment, and can be implemented without requiring any change of the underlying network hardware or software.

In particularly preferred embodiments, the circuit-switched telephony network may be a wireless cellular circuit-switched telephony network, the second transmission module being arranged to transmit over the wireless cellular circuit-switched telephony network, and the signal processing apparatus may be configured to supply the second signal to the second transmission module for transmission to said receiver over the wireless cellular circuit-switched telephony network.

The first signal may comprise one of a Wideband and a Super Wideband signal, and the second signal may comprise a Narrowband signal.

The signal processing apparatus may be further configured to generate a third signal from the voice signal and to supply the third signal to the first transmission module for transmission to said receiver via the packet-switched data network, wherein the first signal may comprise a higher frequency band without an intermediate frequency band and lower frequency band, the second signal may comprise an intermediate frequency band without the higher frequency band and lower frequency band, and the third signal may comprise the lower frequency band without the higher frequency band and intermediate frequency band.

In some embodiments, the receiver may not have circuit-switched capability, and the second transmission module may be arranged to transmit to the receiver via a gateway from the circuit-switched network to the packet-switched data network.

According to a further aspect of the present invention, there is provided a terminal for receiving a voice signal, comprising: a receiver having a first reception channel arranged to receive at least a first signal over a packet-switched data network and a second reception channel arranged to receive a second signal over a circuit-switched telephony network, the first and second signals each representing information from the voice signal over a same portion of time; a speaker for playing the voice signal; and signal processing apparatus coupled to the receiver and the speaker, configured to reconstruct said voice signal from the first and second signals, and to output the voice signal to the speaker.

Preferably the circuit-switched telephony network is a wireless cellular circuit-switched telephony network, the second reception channel being arranged to receive the second signal over the wireless cellular circuit-switched telephony network.

In further embodiments, the first signal may comprise the higher frequency band and a lower frequency band, whilst the second signal may comprise the lower frequency band without the higher frequency band, and the signal processing apparatus may be configured to reconstruct the voice signal by switching between the first and second signals.

The signal processing apparatus may be configured to switch between the first and second signals in dependence on a quality measure of the second signal. For example the quality measure may comprise one of a delay, loss rate, and a distortion measure.

According to another aspect of the present invention, there is provided a method of transmitting a voice signal, comprising: generating a voice signal from a microphone; and operating a signal processing apparatus to generate a first signal and a second signal from the voice signal, each representing information from the voice signal over a same portion of time; transmitting the first signal to a receiver via a packet-switched data network, and transmitting the second signal to said receiver via a circuit-switched telephony network.

According to another aspect of the present invention, there is provided a method of receiving a voice signal, comprising: receiving at least a first signal over a packet-switched data network and a second signal over a circuit-switched telephony network, the first and second signals each representing information from the voice signal over a same portion of time; operating signal processing apparatus to reconstruct said voice signal from the first and second signals, and to output the voice signal to a speaker.

These methods may comprise further steps in accordance with any of the above terminal features.

According to another aspect of the present invention, there is provided a communication application for transmitting a voice signal, the communication application comprising code embodied on a computer-readable medium and configured so as when executed on a processing apparatus of a user device to: receive a voice signal from a microphone of the user device; and generate a first signal and a second signal from the voice signal, each representing information from the voice signal over a same portion of time; supply the first signal to a first transmission module of the user device for transmission to a receiver via a packet-switched data network, and supply the second signal to a second transmission module for transmission to said receiver via a circuit-switched telephony network.

According to another aspect of the present invention, there is provided a communication application for receiving a voice signal, the communication application comprising code embodied on a computer-readable medium and configured so as when executed on a processing apparatus of a user device to: receive at least a first signal over a first reception channel of a packet-switched data network and a second signal over a second reception channel of a circuit-switched telephony network, the first and second signals each representing information from the voice signal over a same portion of time; and reconstruct said voice signal from the first and second signals, and output the voice signal to a speaker of the user device.

These communication applications may be further configured in accordance with any of the above terminal features.

BRIEF DESCRIPTION OF THE DRAWINGS

For a better understanding of the present invention and to show how it may be put into effect, reference will be made to the accompanying drawings in which:

FIG. 2 is a schematic block diagram of a first solution for providing enhanced circuit-switched calls, and FIG. 3 is a schematic block diagram of a second solution for providing enhanced circuit-switched calls.

DETAILED DESCRIPTION OF PREFERRED EMBODIMENTS

Figure 1A:
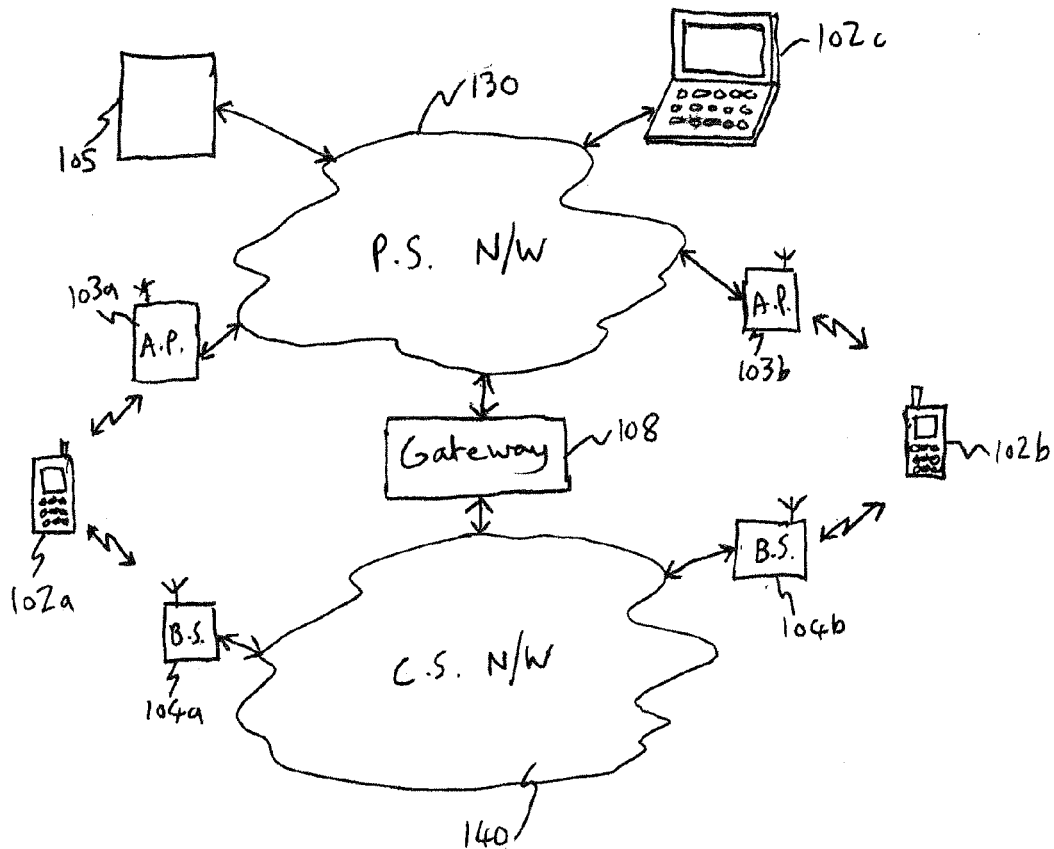
FIG. 1a is a schematic illustration of a communication system comprising a circuit-switched telephony network and a packet-switched data network.

FIG. 1a shows a communication system comprising a first, packet-switched network 130 such as the Internet; and a second, circuit-switched network 140 such as a mobile cellular network. The mobile cellular network comprises a plurality of base stations 104a, 104b (sometimes referred to as node Bs in 3GPP terminology). Each base station 104a, 104b serves a corresponding cell of the cellular network 140. Further, the packet-switched network 130 comprises a plurality of wireless access points 103a, 103b for accessing the Internet such as wi-fi access points. These may be the access points of one or more wireless local area networks (WLANs). Internet access by such means is sometimes referred to as Unlicensed Mobile Access (UMA).

A plurality of mobile terminals such as mobile phones 102a, 102b are arranged to communicate over the circuit-switched network 140 via the base stations 104a, 104b, and to communicate over the packet-switched network 130 via the wireless access points 103a, 103b. For example, each mobile phone 102a, 102b may comprise a short-range wireless transceiver (e.g. wi-fi) for accessing the Internet 101 via the wireless access points 106 over an unlicensed RF band (whilst cellular wireless transceivers typically operate on licensed RF bands).

A plurality of dedicated packet-switched terminals such as a desktop or laptop PC 102c and one or more servers 105 may also be connected to the packet-switched network 130. In addition, one or more gateway terminals 108 may be connected between the packet-switched network 130 and the circuit-switched network 140.

Each mobile terminal 102a, 102b comprises a transmitter and receiver. In each mobile terminal 102a, 102b, the transmitter comprises a first transmission module arranged to transmitting signals over the packet-based network 130 via the access points 103a, 103b, and a second transmission module arranged to transmit signals over the circuit-switched network 140 via the base stations 104. The receiver comprises a first reception module arranged to receive signals over the packet-based network 130 via the access points 103a, 103b, and a second reception module arranged to receive signals over the circuit-switched network 140 via the base stations 104a, 104b.

Figure 1B:
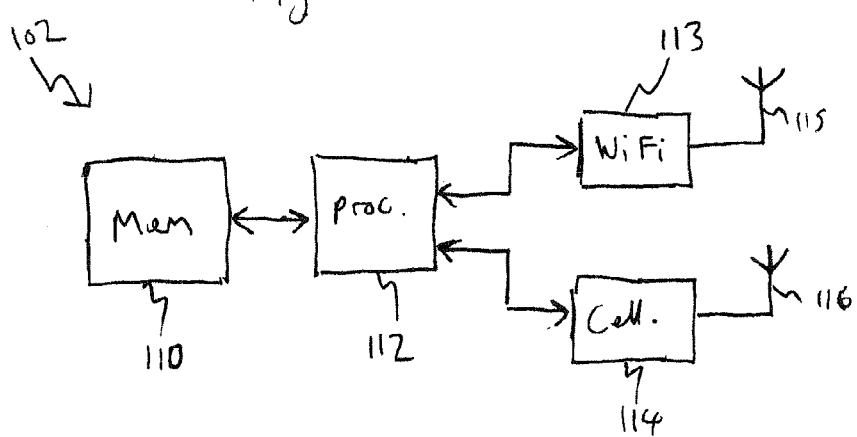
FIG. 1b is a schematic block diagram of a mobile terminal.

As illustrated in FIG. 1b, each terminal 102a, 102b preferably comprises a processor 112, a memory 110 coupled to the processor 112, a first radio-frequency (RF) front-end 113 coupled to the processor 112, a first antenna 115 coupled to the first RF front-end, a second RF front-end 114 coupled to the processor, and a second antenna coupled to the RF front-end 114. The RF front-end 114 comprises dedicated circuitry for transmitting and receiving signals over the air interface to and from a base station 104, via the antenna 116. The RF front-end 113 comprises dedicated circuitry for transmitting and receiving signals over the air interface to and from the access points 103, via the antenna 115. The processor 112 is arranged to execute code stored in the memory 110; and under control of the executed code to output signals to the first RF front-end 113 for transmission to a wireless access point 103, to take input signals from the first RF front-end received from a wireless access point 103, to output signals to the second RF front-end 114 for transmission to a base station 104, and to take input signals from the second RF front-end 114 received from the base station 104.

The first transmission and reception modules are thus formed of the relevant hardware in the first RF front-end 113 combined with a first portion of code stored in the memory 110 and arranged for execution on the processor 112. The first portion of code comprises a codec configured to encode voice signals for transmission over the packet-switched network 130 and to decode voice signals received over the packet-switched network 130, and may also comprise a suitable protocol for establishing a virtual channel with another terminal 102 over the packet-switched network 130. The second transmission and reception modules are formed of the relevant hardware in the second RF front-end 114 combined with a second portion of code stored in the memory 110 and arranged for execution on the processor 112. The second portion of code is configured to encode voice signals for transmission over the circuit-switched network 140 and to decode voice signals received over the circuit-switched network 140. So in embodiments the first and second modules comprise physically separate RF transceivers, albeit with a software element, for transmitting on different frequencies according to different protocols.

Each of the user terminals 102a, 102b, 102c is installed with a communication client application on the memory 110, arranged for execution on the processor 112 and configured so as when executed to establish a VoIP call with another user terminal 102. In embodiments this may be achieved using a de-centralized peer-to-peer call set-up procedure, whereby the calling client application looks up the IP address of the callee from a distributed database, distributed amongst other end-user terminals 102 (i.e. other peers). The caller and callee then exchange digital certificates in order to prove their identities. However non-P2P call set-up is also an option, whereby address look-up and authentication are performed via a server 105.

The invention enhances the perceived call quality on voice calls by sending information about the speech signal simultaneously via a circuit-switched and a data channel, and combining both information streams on the receiver side.

This may provide some or all of the following advantages over the VoLGA system mentioned above:
  (a) running the circuit-switched and VoIP calls simultaneously simplifies the synchronization between the two voice signals on the receiving side;
  (b) in certain embodiments, running the circuit-switched and VoIP calls simultaneously avoids a gap while switching between the two voice signals on the receiving side;
  (c) it is possible to implement before LTE deployment;
  (d) it need not require any change of the underlying network hard- or software; and
  (e) in particularly preferred embodiments it can be used to enable wideband (WB) and/or super wideband (SWB) calls in networks where the circuit-switched channel is only narrowband (NB).

Cellular circuit-switched (CS) calls come with the advantage that they provide consistent QoS because they are prioritised on the cellular network 140. However, they are limited in acoustical bandwidth to 4 kHz, commonly known as narrowband (NB) quality. In the world of VoIP on the other hand, NB speech is long deprecated and today the standard is wideband (WB; 8 kHz)—or even super wideband (SWB; 12 kHz) as used in Skype. (S)WB calls provide a far better user experience than NB calls—simply since more information content of the original speech signal is conveyed to the receiver. This not only sounds better, but also overcomes intelligibility problems inherent to NB (e.g., it is difficult to distinguish "s" and "f" over a NB connection). Cellular data channels however only guarantee a "best effort" in service. This is why sending pure VoIP over a cellular data channel is unreliable. We therefore propose to use the CS voice channel in conjunction with additional information about the speech signal on the data channel to enable the best of both worlds: the consistent QoS of CS and the enhanced user experience of (S)WB calls.

To implement the invention, the user equipment 102 should preferably support the following features:
  the microphone signal is processed by the VoIP application before being encoded and transmitted by the circuit-switched system,
  the received and decoded circuit-switched signal is processed by the VoIP application before playback through the loudspeaker,
  the circuit-switched network 140 and packet-switched data network 130 can be accessed simultaneously.

Figure 1C:
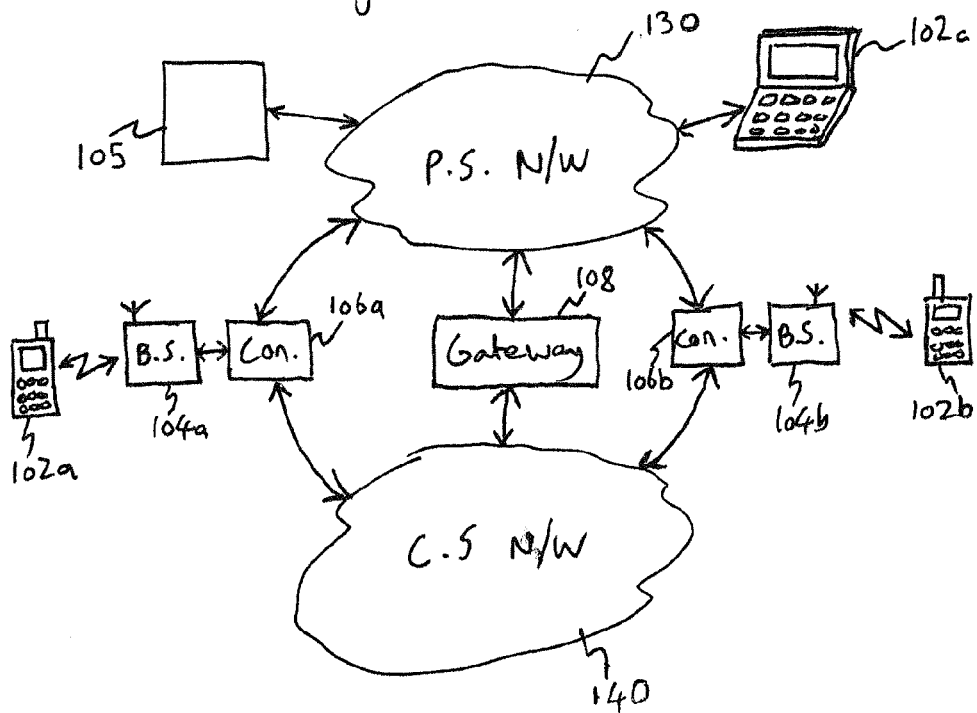
FIG. 1c is another schematic illustration of a communication system comprising a circuit-switched telephony network and a packet-switched data network, FIG. 1d schematically illustrates an enhanced circuit-switched call involving a gateway to a packet-switched data network.
Figure 1D:
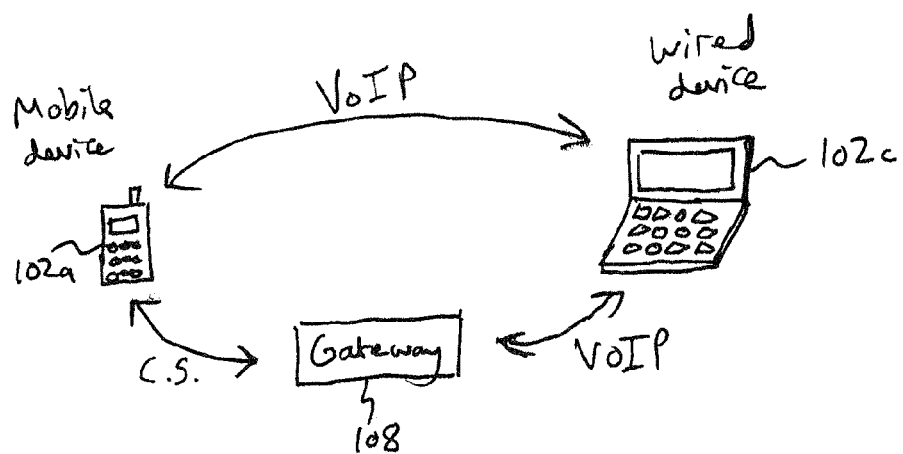

In some embodiments, a gateway 108 can be used if only one of the two end points 102 is connected through the circuit-switched network 140, as shown in FIG. 1*d*. The gateway 108 is arranged to convert a NB circuit-switched call to a NB VoIP call and vice versa (the voice signal can travel both ways, the gateway 108 having two-way functionality). In parallel to this NB call, a (S)WB all-VoIP call is performed over the packet-switched network 130.

In one particularly preferred embodiment of the present invention, the input signal gets split into three frequency bands (LF+NB+HF) at the encoder side, where the NB band is the standard speech band used by the CS voice calls (typically 300-3500 Hz). The low-frequency (LF) band contains all frequencies below the NB band (typically 0-300 Hz), and the high-frequency (HF) band all frequencies above the NB band up to the desired limit, i.e., 3500-8000 Hz for WB or 3500-12000 Hz for SWB. The LF band may optionally be dropped depending on the implementation.

There are at least two possible solutions for reconstructing the information contents sent over the two different channels at the receive side 102*b*.

A first solution is illustrated schematically in FIG. 2. The transmitting user terminal 102*a* comprises a microphone 202 and a VoIP client application 201*a*. The VoIP client application 201*a* comprises an analysis filter bank 204, and a first encoder 206 (part of the first transmission module). The transmitting terminal 102*a* also comprises a second encoder 208 (part of the second transmission module). The analysis filter bank 204 is coupled between the output of the microphone 202 and the inputs of the first encoder 206 and second encoder 208. Further, the receiving terminal 102*b* comprises a speaker 218 and a client application 201*b*. The client application 201*b* comprises a switch 216, a synchroniser 214, and a first decoder 210 (part of the first reception module). The receiving terminal 102*b* also comprises a second decoder 212 (part of the second reception module). The synchroniser 214 is coupled between the outputs of the first decoder 210 and second decoder 212 and respective inputs of the switch 216. The output of the switch 216 is coupled to the input of the speaker 218.

The analysis filter bank 204 receives the voice signal from the microphone 202 and filters it into different bands which are supplied to the encoders 206, 208. The first encoder 206 is a VoIP encoder which is arranged to encode the full-band (S)WB signal, which is then transmitted over the packet-switched data network 130. The second encoder 208 encodes the NB signal, which is transmitted over the circuit-switched network 140. At the receive side, the receiver 102*b* can decode both versions of the signal simultaneously using the first decoder 210 and second decoder 212 respectively, time aligns them in the synchronization module 214, and the switch 216 decides which of the circuit-switched NB data and the full-band VoIP data to play out based on a simple distortion measure or even a rule. For example the rule could be to play out the full-band audio from the VoIP decoder 210 whenever it is available within a certain maximum delay (a typical limit required for reasonable conversational quality would be 300-500 ms), but otherwise to play out the circuit-switched NB signal from the second decoder 212. Other criteria could also be used. The switching between the signal received over the packet-switched and circuit-switched channel is preferably based on some measure of quality derived from the received signal, evaluated at the receiver, and preferably performed dynamically (i.e. on the fly in response to changing quality). Alternatively however, it could be based on reported channel conditions, or on a user selection based on the user's perceived experience of the call.

This first solution can be enhanced with some temporal alignment performed on both signals by the synchroniser 214 to avoid short segments of the speech being played out twice or getting dropped at the time of switching. A time alignment accuracy of 10 to 50 ms is good enough. Such synchronization can be done by delaying either the VoIP or the circuit-switched signal such that a correlation measure between the signals is maximized. Alternatively, the correlation measure can be computed between the envelopes of the VoIP and circuit-switched signals, where the envelope signals can be downsampled to once per frame or once per subframe to reduce complexity. The synchronization needs to be adaptive over time to respond to changes in the transmission delay of the VoIP and circuit-switched signals.

The above solution has the advantage of simpler implementation and high quality, at the cost of a higher data rate on the packet-switched data network 130.

A second solution show in FIG. 3 reduces the data rate on the packet-switched data network 130, but is limited in quality for the NB part of the signal by the circuit-switched network 140, and requires tighter synchronization between the circuit-switched and VoIP signals.

FIG. 3 shows an embodiment of this second solution. In this embodiment, the VoIP encoder 206 only encodes information about the LF and HF bands, not any information about the NB band. Thus only the LF and HF bands are transmitted over the packet-switched network 130, and not the NB band, thereby avoiding unnecessary redundancy on the data channel. At the receive side, instead of a switch 216 the receiver 102*b* comprises a synthesis filter block 220 which is configured to combine the signal from the circuit-switched NB decoder 212 with the LF and HF signals from the VoIP decoder 210 and thereby form a full-band signal. Note that typically most of the available bit rate is spent in the NB part of the signal, thereby keeping the data rate on the packet-switched data channel low.

This second solution requires relatively accurate time alignment of the VoIP signal to the NB signal in the synchroniser 214 at the receiver side, as both signals are played out simultaneously. The time alignment accuracy should be no more than a few milliseconds to avoid loss in quality. Such synchronization can be done based on the temporal envelope of the speech waveforms or the LPC excitation signals of the VoIP and circuit-switched signals, by delaying either signal such that a correlation measure between the envelopes is maximized. The synchronization should preferably be adaptive over time to respond to changes in the transmission delay of the VoIP and circuit-switched signals.

The present invention may be implanted in VoIP clients for mobile devices, and at least the receive functionality may also be implemented in desktop clients 102*c* on the packet-switched data network 130 for interoperability.

It will be appreciated that the above embodiments have been described only by way of example.

For instance, the present invention is not limited to the embodiment employing wireless access points 103 such as wi-fi access points. In other embodiments, access to the packet-switched network could be achieved by other means such as GPRS (General Packet Radio Service) or a High Speed Packet Access (HSPA) service. FIG. 1*c* shows such an embodiment. At a higher level of the cellular hierarchy, the cellular network 140 further comprises a plurality of cellular controller stations 106 each coupled to a plurality of base stations, including a first controller station 106*a* coupled to the first base station 104*a* and a second cellular controller station 106*b* coupled to the second base station 104*b*. The controller stations 106 may be referred to as Base Station Controllers (BSCs) in GSM/EDGE terminology, Radio Network Controllers (RNCs) in USTM or HSPA terminology, or VoLGA Access Network Controllers (VANCs) in LTE terminology. The controller stations 105 are thus arranged to allow access to packet-based communications via the base stations 104, including access to the Internet 101.

As in the previous embodiment, in each mobile terminal 102*a*, 102*b* the transmitter comprises a first transmission module providing a first transmission mechanism for transmitting signals over the packet-based network 130, and a second transmission module providing a second transmission mechanism for transmitting signals over the circuit-switched network 140. The receiver comprises a first reception module providing a first reception mechanism for receiving signals over the packet-based network 103, and a second transmission module providing a second transmission mechanism for receiving signals over the circuit-switched network 101. However, in this case the first and second transmission and reception mechanisms may be implemented solely in the form of different software modules stored in the memory 110 and arranged for execution on the processor 112, which both access the packet-based and circuit switched networks via the same physical front-end 114. The first transmission mechanism of the mobile terminal 102*a* preferably comprises a VoIP encoder and a protocol for transmitting packets over a virtual channel established over the GPRS system, e.g. by transmitting packets with session information including a session identifier. Reciprocally, the first reception mechanism of the mobile terminal 102*b* comprises a VoIP decoder and a protocol for receiving packets over the virtual channel, e.g. be interpreting the received session information. The second transmission mechanism then comprises a more conventional cellular voice encoder and signaling protocol, and the second reception mechanism in the mobile terminal 102*b* comprises a conventional cellular voice decoder and signaling protocol.

In other alternative embodiments, the circuit-switched network need not be a mobile cellular network, but could instead be a landline network (sometimes called a "plain old telephone system", POTS)

Furthermore, the present invention is not limited to use over the Internet, to VoIP or to a P2P topology. Other packet-switched networks or protocols could be used, and other call set-up techniques could be employed.

Other variations of the present invention may be apparent to a person skilled in the art given the disclosure herein. The present invention is not limited by the described embodiments, but only by the appendant claims.

The invention claimed is:

1. A terminal for transmitting a voice signal, comprising:
a transmitter having a first transmission module arranged to transmit signals over a packet-switched data network and a second transmission module arranged to transmit signals over a circuit-switched telephony network;
a microphone for generating a voice signal for the call; and
signal processing apparatus coupled to the transmitter and the microphone, configured to:
generate a first signal comprising a higher frequency band without a lower frequency band and a second signal comprising the lower frequency band without the higher frequency band from the voice signal for the call, each representing information from the voice signal over a same portion of time, generate a third signal from the voice signal and to supply the third signal to the first transmission module for transmission to a receiver via the packet-switched data network, the first signal comprising the higher frequency band without both of the lower frequency band and an extra low frequency band, the second signal comprising the lower frequency band without both of the higher frequency band and the extra low frequency band, and the third signal comprising the extra low frequency band without both of the higher frequency band and the lower frequency band, wherein the lower frequency band contains frequencies used by circuit network voice calls, the higher frequency band contains frequencies above the lower frequency band to a limit, and the extra low frequency band contains frequencies below the lower frequency band;
supply the voice signal during the call to the receiver as both the first signal encoded by the first transmission module for transmission to said receiver via the packet-switched data network, and the second signal encoded by the second transmission module for transmission to said receiver via the circuit-switched telephony network; and
provide the voice signal to the transmitter to send to the receiver to enable the receiver to reconstruct the voice signal from a combination of the first signal and the second signal.

2. The terminal of claim 1, wherein the circuit-switched telephony network is a wireless cellular circuit-switched telephony network, the second transmission module being arranged to transmit over the wireless cellular circuit-switched telephony network, and the signal processing apparatus further configured to supply the second signal to the second transmission module for transmission to said receiver over the wireless cellular circuit-switched telephony network.

3. The terminal of claim 1, wherein transmission over the circuit-switched telephony network is prioritized relative to transmission over the packet-switched data network, and the packet-switched data network supports a higher bandwidth than the circuit-switched telephony network.

4. The terminal of claim 1, wherein the first signal comprises one of a Wideband and a Super Wideband signal, and the second signal comprises a Narrowband signal.

5. The terminal of claim 1, wherein said receiver does not have circuit-switched capability, and the second transmission module is arranged to transmit to the receiver via a gateway from the circuit-switched network to the packet-switched data network.

6. The terminal of claim 1, wherein the signal processing apparatus is further configured to split the voice signal into the higher frequency band and the lower frequency band.

7. The terminal of claim 1, wherein said reconstructing aligns the first signal and the second signal within a few milliseconds.

8. The terminal of claim 1, wherein the higher frequency band contains frequencies above 3500 Hz to a limit, the lower frequency band contains frequencies between 300 Hz and 3500 Hz, and the extra low frequency band contains frequencies below 300 Hz.

9. A terminal for receiving a voice signal for a call, comprising:
   a receiver having a first reception channel arranged to receive during the call at least a first signal over a packet-switched data network, the first signal comprising a high frequency band and a low frequency band that is lower than a standard speech frequency band without the standard speech frequency band, and a second reception channel arranged to receive during the call a second signal over a circuit-switched telephony network, the second signal comprising the standard speech frequency band and without both the high frequency band and the low frequency band, the first signal and the second signal each representing information from the voice signal over a same portion of time sent during the call for receipt by said receiver;
   a speaker for playing the voice signal; and
   signal processing apparatus coupled to the receiver and the speaker, configured to:
      synchronize the first signal and the second signal adaptively over time such that a correlation measure between the signals is maximized;
      reconstruct said voice signal from the first signal and the second signal;
      switch between the first signal and the second signal based at least in part on a quality measure including a packet loss rate of the first signal; and
      output the voice signal to the speaker.

10. The terminal of claim 9, wherein the signal processing apparatus is configured to synchronize the first signal and the second signal in response to changes in transmission delay of the first signal and the second signal.

11. The terminal of claim 9, wherein the circuit-switched telephony network is a wireless cellular circuit-switched telephony network, the second reception channel being arranged to receive the second signal over the wireless cellular circuit-switched telephony network.

12. The terminal of claim 9, wherein the quality measure is further based at least in part on one or more of a delay and a distortion measure.

13. The terminal of claim 9, wherein the first signal comprises one of a Wideband and a Super Wideband signal, and the second signal comprises a Narrowband signal.

14. The terminal of claim 9, wherein said reconstructing aligns the first signal and the second signal within 10 to 50 milliseconds.

15. The terminal of claim 9, wherein the high frequency band contains frequencies above 3500 Hz to a limit, the standard speech frequency band contains frequencies between 300 Hz and 3500 Hz, and the low frequency band contains frequencies below 300 Hz.

16. A method of transmitting a voice signal, comprising:
   generating a voice signal for a call from a microphone;
   operating a signal processing apparatus to split the voice signal into a first frequency band from the voice signal without a second frequency band from the voice signal, the second frequency band from the voice signal without the first frequency band from the voice signal for the call, and a third frequency band from the voice signal with the first frequency band and without the second frequency band, the first, second, and third frequency bands each representing information from the voice signal over a same portion of time, wherein the second frequency band is a lower frequency band containing frequencies used by circuit network voice calls, the first frequency band is a higher frequency band containing frequencies above the lower frequency band to a limit, and the third frequency band is an extra low frequency band containing frequencies below the lower frequency band; and
   during the call, transmitting the first frequency band to a receiver via a packet-switched data network, transmitting the second frequency band to said receiver via a circuit-switched telephony network to enable the receiver to reconstruct the voice signal from a combination of the first frequency band and the second frequency band, and transmitting the third frequency band to the receiver via the packet-switched data network to enable the receiver to reconstruct the voice signal from a combination of the first frequency band, the second frequency band, and the third frequency band.

17. The method of claim 16, wherein the first frequency band contains frequencies above 3500 Hz to a limit, the second frequency band contains frequencies between 300 Hz and 3500 Hz, and the third frequency band contains frequencies below 300 Hz.

18. A method of receiving a voice signal for a call, comprising:
   receiving at least a first signal comprising a high frequency band and a low frequency band that is lower than a standard speech frequency band without the standard speech frequency band over a packet-switched data network and a second signal comprising the standard speech frequency band and without both the high frequency band and the low frequency band over a circuit-switched telephony network, the first signal and the second signal each representing information from the voice signal for the call over a same portion of time and sent during the call for receipt by said receiver;
   reconstructing said voice signal from the first signal and the second signal by an operating signal processing apparatus; and
   outputting the voice signal to a speaker.

19. A communication application for transmitting a voice signal, the communication application comprising code embodied on a computer-readable medium other than a signal per se and configured so as when executed on a processing apparatus of a user device to:
   receive a voice signal for a call from a microphone of the user device; and
   split the voice signal for the call into a standard speech frequency band, a higher frequency band comprising frequencies higher than the standard speech frequency band, and a lower frequency band comprising frequencies lower than the standard speech frequency band, each representing information from the voice signal over a same portion of time, wherein the standard speech frequency band contains frequencies used by circuit network voice calls, the higher frequency band contains frequencies above the lower frequency band to a limit, and the lower frequency band contains frequencies below the standard speech frequency band;

encode, by a first transmission module of the user device for transmission to said receiver via a packet-switched data network, a first signal with the higher frequency band, with the lower frequency band, and without the standard speech frequency band; and encode, by a second transmission module for transmission to said receiver via a circuit-switched telephony network, a second signal with the standard speech frequency band, without the higher frequency band, and without the lower frequency band; and supply, during the call, the voice signal to the transmitter to send to the receiver to enable the receiver to reconstruct the voice signal from a combination of the first signal and the second signal.

20. The communication application of claim 19, wherein the high frequency band contains frequencies above 3500 Hz to a limit, the standard speech frequency band contains frequencies between 300 Hz and 3500 Hz, and the low frequency band contains frequencies below 300 Hz.

21. A communication application for receiving a voice signal for a call, the communication application comprising code embodied on a computer-readable medium other than a signal per se and configured so as when executed on a processing apparatus of a user device to:

receive during the call at least;
- a first signal comprising a high frequency band that contains frequencies higher than a standard speech frequency band, a low frequency band that contains frequencies lower than the standard speech frequency band for the call over the same portion of time, and without the standard speech frequency band for the call over a first reception channel of a packet-switched data network, and
- a second signal comprising the standard speech frequency band without both the low frequency band and the high frequency band for the call over a second reception channel of a circuit-switched telephony network,
- the first signal and the second signal each representing information from the voice signal over a same portion of time; and reconstruct said voice signal from a combination of the first signal and the second signal; and output the voice signal to a speaker of the user device.

* * * * *